No. 749,919. PATENTED JAN. 19, 1904.
C. A. CLARK.
HANDLE FOR SNAP SWITCHES.
APPLICATION FILED JAN. 3, 1903.
NO MODEL.
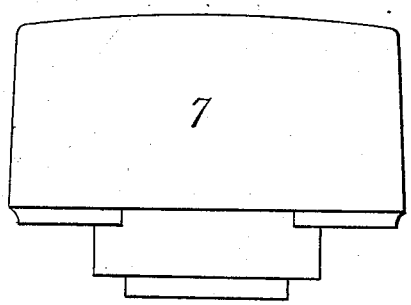
Fig. 1
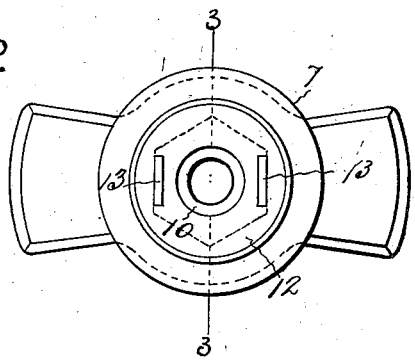
Fig. 2
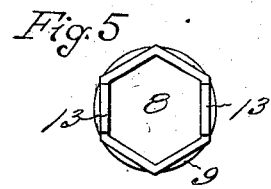
Fig. 5
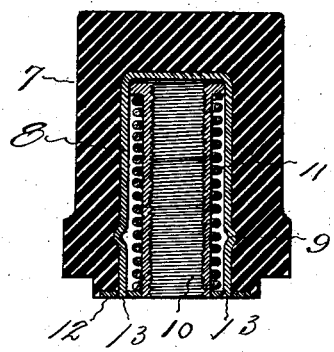
Fig. 3
Fig. 4
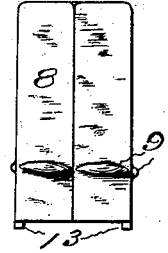
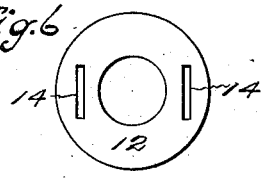
Fig. 6
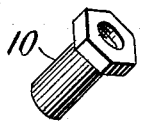
Fig. 7
Witnesses.
W. F. Lakin
Ethel M. Lowe
Inventor.
Charles A. Clark,
Harry R. Williams
Attorney.
THE NORRIS PETERS CO., PHOTO-LITHO., WASHINGTON, D. C.

No. 749,919. Patented January 19, 1904.

UNITED STATES PATENT OFFICE.

CHARLES A. CLARK, OF HARTFORD, CONNECTICUT.

HANDLE FOR SNAP-SWITCHES.

SPECIFICATION forming part of Letters Patent No. 749,919, dated January 19, 1904.

Application filed January 3, 1903. Serial No. 137,635. (No model.)

*To all whom it may concern:*

Be it known that I, CHARLES A. CLARK, a citizen of the United States, residing at Hartford, in the county of Hartford and State of Connecticut, have invented certain new and useful Improvements in Handles for Snap-Switches, of which the following is a specification.

This invention relates to a rotary snap-switch handle which has means for connecting it elastically with the operative spindle.

The object is to produce a simple and attractive handle with a strong and easily-constructed elastic attaching means which is entirely concealed.

The handle that is illustrated contains a sleeve with an interiorly-threaded plunger which is held from complete withdrawal out of the sleeve by a spring that thrusts between a part of the plunger and a piece secured to the sleeve.

Figure 1 of the drawings shows a side elevation, on enlarged scale, of one of the handles. Fig. 2 shows a plan of the handle looking from the bottom. Fig. 3 shows a vertical section on the plane indicated by the dotted line 3 3 of Fig. 2. Fig. 4 is a side elevation of the sleeve. Fig. 5 is a plan of the bottom of the sleeve. Fig. 6 is a plan of the washer that is secured to the bottom of the sleeve, and Fig. 7 is a perspective view of the plunger in the sleeve.

The body of the handle 7 may be formed of any suitable material in any desired design. It, however, is preferably molded to shape from insulating composition. A metallic sleeve 8 is embedded in this body when it is formed. This sleeve is preferably hexagonal in cross-section except where the walls are slightly expanded, as at 9. The angular cross-sectional shape prevents the sleeve from rotating in the body, and the expanded portion holds the sleeve against withdrawal from the body. In the sleeve is a hollow plunger 10. This plunger at the inner end has a head that is preferably hexagonal in cross-section and loosely fits the interior of the sleeve. A spring 11 is placed upon the plunger in such manner as to thrust between the head of the plunger and the washer 12, that is fastened to the outer end of the sleeve. The opening through the plunger is threaded, so that it may be screwed on the threaded end of the switch-spindle, and the opening through the washer is of such a size that the plunger fits it loosely. When the sleeve is formed, two downwardly-projecting lugs 13 are left at the open end. The washer has two slots 14, adapted to receive the lugs. When the washer is placed over the end of the sleeve with the lugs in the slots, the projecting ends of the lugs are headed over, so as to hold the washer in place.

With the parts assembled the spring thrusts between the head of the plunger and the washer, which is held to the outer end of the sleeve, so that while the plunger may be drawn downwardly a considerable distance it is prevented from complete removal from the sleeve.

From the exterior the handle appears like an ordinary handle. The yielding of the plunger, however, allows the handle to be screwed upon the spindle of a rotary switch in such manner as to hold the cap, if it is a surface-switch, or the plate, if it is a flush-switch, tightly in position. The parts comprising this construction are cheap to make, easy to assemble, allow for considerable variation, and when put together cannot be separated without being broken.

I claim as my invention—

1. A handle consisting of a body, a sleeve with an expanded portion between its ends embedded within the body, a plunger movable within the sleeve, a washer secured to the outer end of the sleeve and a spring thrusting against a portion of the plunger and against the washer secured to the outer end of the sleeve, substantially as specified.

2. A handle consisting of a body of molded insulating material, a sleeve that is angular in cross-section and has an expanded portion between its ends embedded within the body, a plunger having a head with an angular cross-section movable within the sleeve, a washer secured to the end of the sleeve and a spring surrounding the plunger and thrusting against the head and against the washer, substantially as specified.

3. A handle consisting of a body of molded insulating material, a sleeve that is angular in cross-section and has an expanded portion between its ends embedded within the body and headed lugs projecting downwardly from the open end, a plunger having a head with an angular cross-section movable within the sleeve, a washer having slots receiving the lugs and secured to the end of the sleeve by the lugs, and a spring surrounding the plunger and thrusting against the head and against the washer, substantially as specified.

CHARLES A. CLARK.

Witnesses:
H. R. WILLIAMS,
ETHEL M. LOWE.